June 13, 1933. G. A. SHAPE 1,913,961
ANTIGLARE SHIELD FOR WINDSHIELDS
Filed Oct. 8, 1931
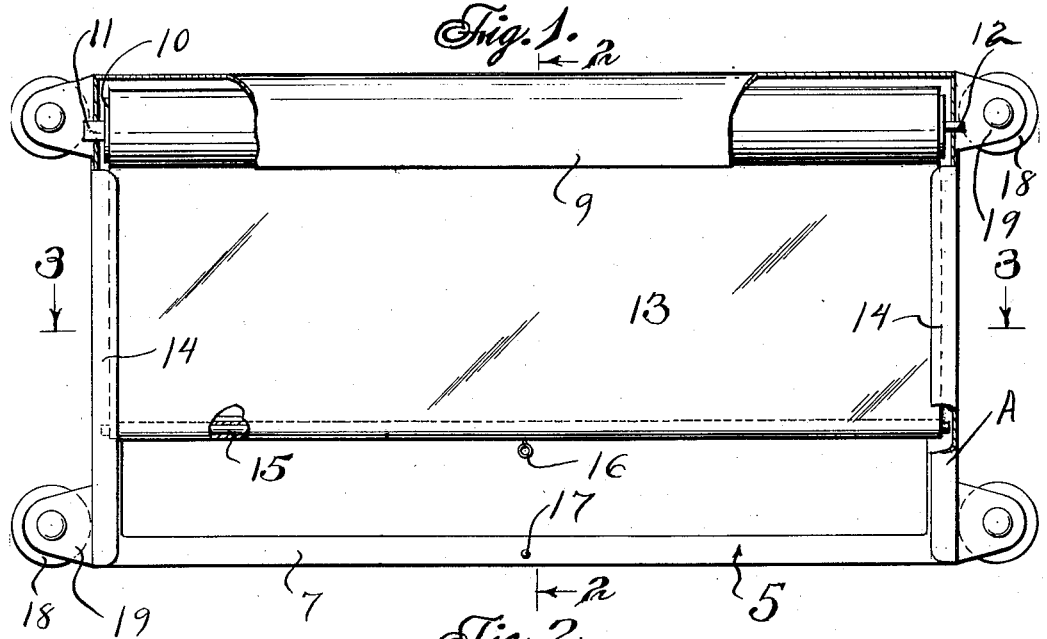
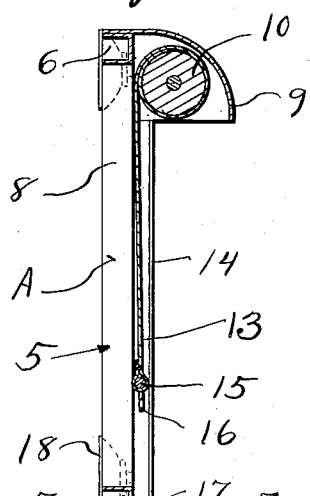
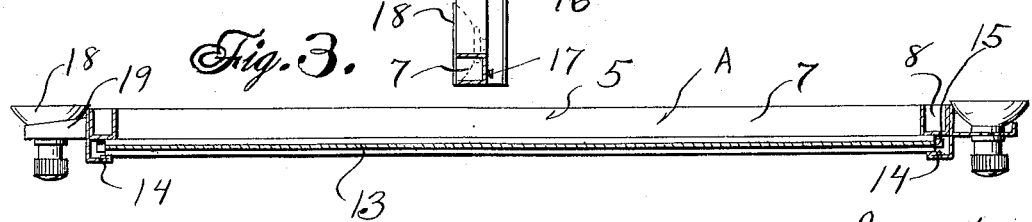

Patented June 13, 1933

1,913,961

UNITED STATES PATENT OFFICE

GUSTAVE A. SHAPE, OF MADISON, WISCONSIN

ANTIGLARE SHIELD FOR WINDSHIELDS

Application filed October 8, 1931. Serial No. 567,610.

This invention appertains to motor vehicles and more particularly to a novel attachment therefor, for eliminating difficulty contingent with night driving and driving against the sun in the daytime.

It is a well recognized fact that many accidents are caused by motorists being temporarily blinded from glaring headlights at night time, and the rays of the sun during the daytime.

Many attempts have been made by inventors to overcome these difficulties, but none of these attempts, as far as I am aware, have been successful or universally adopted by motorists.

It is, therefore, a prime object of my invention to provide an attachment which can be readily associated with an automobile without any change in the construction thereof, which can be readily brought into use when desired and which will effectively eliminate glare in the eyes of a motorist, both from the sun and approaching headlights, the device lessening to a large extent, the strain on the eyes of motorists incident to driving.

Another salient object of my invention is the provision of a rigid open rectangular frame having means at the corners thereof for engaging the inner face of the windshield, with a rotatable shade roller carried by the upper end of the frame having wound thereon, a colored transparent curtain, whereby the curtain can be instantly raised or lowered as desired by the motorist, the colored transparent curtain, when in its lowered position, effectively operating as means for eliminating glare.

A further object of my invention is the provision of an anti-glare shield for motor vehicles, embodying an open rectangular frame, with attaching ears at the corners thereof carrying means for engaging the inner face of a windshield, the upper end of the frame carrying a hood for a rotatable shade roller, having wound thereon a colored transparent screen or shade, which is adapted to be raised or lowered at the will of the operator, guides being carried by the sides of the frame for receiving the side edges of the screen during the raising and lowering thereof, for effectively keeping the screen in proper position.

A still further object of my invention is to provide an improved anti-glare screen for motor vehicles, of the above character, which will be durable and efficient in use, one that will be simple and easy to manufacture and one that can be placed upon the market and incorporated with a conventional windshield of an automobile at a low cost.

With these and other objects in view, the invention consists in the novel construction, arrangement and formation of parts, as will be hereinafter more specifically described, claimed and illustrated in the accompanying drawing, in which:

Figure 1 is a front elevation of my device showing parts thereof broken away and in section to illustrate certain structural features thereof;

Figure 2 is a transverse section through the improved device taken on the line 2—2 of Figure 1, looking in the direction of the arrows;

Figure 3 is a horizontal section through my improved device taken on the line 3—3 of Figure 1, looking in the direction of the arrows.

Referring to the drawing in detail, wherein similar reference characters designate corresponding parts throughout the several views, the letter "A" indicates my improved anti-glare attachment for use in conjunction with the windshields of automobiles.

As shown, my improved device "A" comprises an open rectangular frame 5 embodying the spaced parallel top and bottom rails 6 and 7 and the connecting spaced parallel side rails 8. The frame 5 can be formed of metal, preferably of aluminum, so that the frame will be of extremely light weight. As shown, all of the rails of the frame are of a U-shape in cross section, and I propose to make the frame of thin sheet metal and the rails being of channel construction, will have considerable structural strength. The flanges of the rails all face toward the windshield, and thus a plain finished surface is provided for facing toward the occupants of an automobile with which the device is associated.

The extreme upper end of the frame carries a protecting hood 9 which can also be formed of metal such as aluminum. As shown, the hood 9 is of an arcuate shape in cross section and its top edge and sides can be provided with the flanges for connection with the top rail 6 and the side rails 8. This hood 9 forms a housing for receiving and normally hiding from view, a shade roller 10. This shade roller 10 is of the usual spring type and its terminals carry the pintles 11 and 12, which are received in openings provided for that purpose in the sides of the hood 9.

The shade roller 10 has wound thereon, a transparent colored shade or screen 13, which can be formed of relatively heavy cellophane or from celluloid.

The screen or shade 13 can be made in any color desired, which will reduce glare and which will have a restful effect on the eyes of the motorist, such as green or amber.

In accordance with my invention, I provide vertically disposed guides 14 for the side edges of the screen or shade. These guides 14 extend from the hood 9 to the bottom rail 7 of the frame, and as the screen or shade 13 is wound on and off the roller, the edges of the screen will travel in the guides. I prefer to construct the guides 14 of an angle shape in cross section and to have one of the flanges of each guide formed relatively wide to act as a ready means for permitting the attachment thereof to the outer faces of the side rails 8 of the frame, and thus it can be seen that the screen or shade 13 is guided between the outer flanges of the guides 14 and the outer faces of the side rails 8 of the frame.

In order to facilitate the rolling and unrolling of a screen or shade from the roller 10 and to facilitate the travel of the screen in the guides 14, the lower edge of the screen can carry a guide rod 15, the ends of which extend slightly beyond the side edges of the screen or shade 13 for reception within the guides 14.

When the screen is in its lowermost position, the same can be held against accidental raising movement by the use of any desirable type of fastener, such as by a loop 16 carried by the lower edge of the screen, which can be placed over a button 17 carried by the lower rail of the frame.

Due to the extreme light weight of the frame, the same can be readily associated with the inner face of a windshield of an automobile by the use of vacuum cups 18, and I provide novel means for associating the cups 18 with the frame. This means consists of ears 19 carried by the frame 5 and it is to be noted that these ears are positioned at the four corners of the frame. The ears 19 are provided with openings which removably receive the shanks of the vacuum cups 18. Thus, these cups can be replaced when the same become worn or otherwise unsuitable for further use.

From the foregoing description, it is obvious that I have provided an exceptionally simple and durable device, which can be readily placed on the inner face of a windshield and in which the shade or screen can be instantly brought into and out of operative position by the driver of the vehicle without any inconvenience.

When the screen shade 13 is in its lowered position, the same will act as an effective shield and will prevent injury to the eyes of motorists from glaring headlights or sun, and will permit the motorists to effectively see to guide his vehicle in spite of the glare.

Changes in details may be made without departing from the spirit or the scope of this invention, but what I claim as new is:

As a new article of manufacture, an anti-glare guard for connection with the windshields of motor vehicles comprising an open rectangular frame including top and bottom rails and connecting side rails, all of said rails being of a U-shape in cross section, an arcuate hood carried by the upper end of the frame including top and side attaching flanges for engaging the top and side rails, guides carried by the frame of an angle shape in cross section including relatively wide side flanges connected with the outer faces of the side rails of the frame and relatively narrow front flanges extending in spaced parallel relation to the front faces of the side rails and extending from the hood to the lower rail forming guide channels in connection with said side rails, a curtain roller rotatably received within the hood, a transparent colored anti-glare screen wound upon the roller, a guide rod carried by the lower end of the screen having its terminals extending into the guide channels between the front faces of the side rails and the inner faces of the relatively narrow flanges, companion fastening members carried by the lower end of the screen and the bottom rail of the frame for interconnection with one another when the screen is in its lowermost position, and means carried by the corners of the frame for connecting the same in place on a windshield.

In testimony that I claim the foregoing I have hereunto set my hand at River Falls, in the county of Pierce and State of Wisconsin.

GUSTAVE A. SHAPE.